Dec. 27, 1932.      A. W. HORNIG      1,891,931
MEANS FOR MANUFACTURE OF LAMINATED GLASS

Original Filed March 8, 1929

INVENTOR
AUGUST W. HORNIG
per Carl Prover
ATTORNEY

Patented Dec. 27, 1932

1,891,931

UNITED STATES PATENT OFFICE

AUGUST W. HORNIG, OF CHICAGO, ILLINOIS

MEANS FOR MANUFACTURE OF LAMINATED GLASS

Application filed March 8, 1929, Serial No. 345,520. Renewed April 28, 1932.

The object of my invention is to provide superior containing or holding means for use in the manufacture of laminated glass; the particular purpose being to provide a safe and convenient means for holding the articles to be laminated prior to, and during, the application thereto of heat and pressure; for placing said articles in correct position between the platens of a press; for removing them from such position; for protecting said articles during the process of compression; for reducing breakage of the glass in connection with the process of lamination; and for obtaining superior results in lamination.

Figure 1:
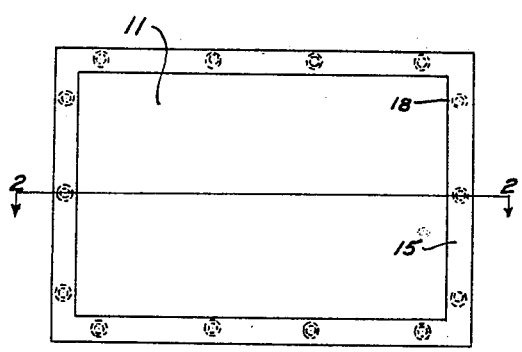
Figure 2:
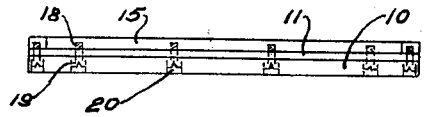
Figure 3:
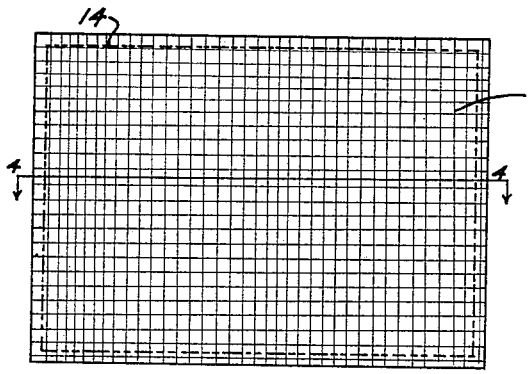
Figure 4:
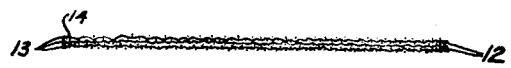
Figure 5:
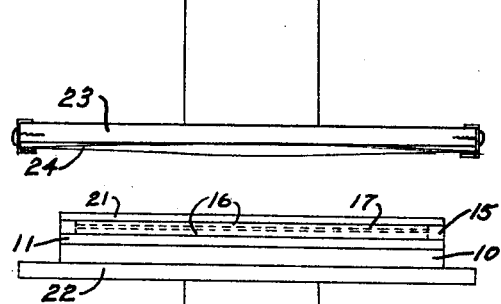
Figure 6:
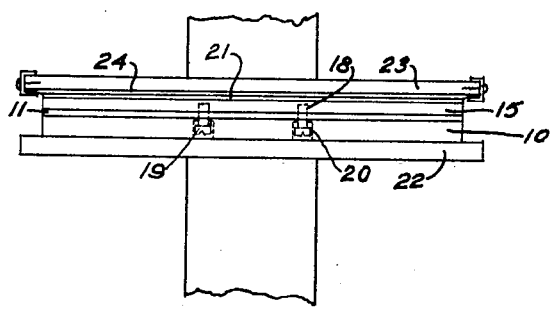

In the drawing, Fig. 1 is a top plan view of the padded tray invented by me; Fig. 2 is a sectional elevation in the plane indicated by line 2—2 in Fig. 1; Fig. 3 is a top plan view of the pad used in connection with my tray; Fig. 4 is a sectional elevation in the plane indicated by line 4—4 in Fig. 3; Fig. 5 is a diagrammatic view, in sectional elevation, of the platens of a press with a press-pad, of my invention, attached to the upper platen, and the parts to be compressed deposited upon the lower platen, preparatory to the beginning of compression; and Fig. 6 is a like view of the parts shown in Fig. 5, at the completion of the down-stroke of the upper platen.

Referring to the drawing, upon a metallic plate 10, of suitable thickness and size, I place a pad 11, made of several layers of cardboard 12, separated, as well as covered, by sheets of muslin 13, all sewed together along their edges by seams 14, or simply consisting of strawboard, compression paper, blotting paper or other material that will readily absorb a liquid, such as water or oil said pad 11 being substantially of the same width and length as plate 10. Upon pad 11 I place a metallic frame 15, the outer length and width of which are the same as those of plate 10 and pad 11, and which is adapted to snugly surround and hold in place, upon pad 11, glass plates 16 and celluloid sheet 17, to be laminated. This frame 15 is preferably made of a thickness equal to the combined thickness of glass plates 16 and celluloid sheet 17. Plate 10, pad 11 and frame 15 are preferably joined together, and held in vertical alignment by bolts 18, preferably provided with slotted heads 19, which are firmly screwed into frame 15 from below, passing through plate 10 and pad 11. Heads 19 are located in holes 20, drilled from below into plate 10, which are deep enough to permit frame 15 and bolts 18 to move to some extent up and down with reference to plate 10 and pad 11, without causing heads 19 to project below the lower surface of plate 10. The purpose of this arrangement is to permit pad 11 to swell and thicken evenly over its whole area, including the portion covered by frame 15, when my tray is immersed in a liquid, and also to permit frame 15 to be moved downward equally with glass plates 16 and celluloid sheet 17 upon compression by the platens of a press. In connection with my tray, I prefer to use a separate pad 21, identical in construction with pad 11.

In the practical use of my tray and pad, I place both my tray and pad into a liquid, preferably cold for a sufficient length of time to permit both pad 11 and pad 21 to become thoroughly soaked with water. I then place my tray upon a table, deposit upon it, within frame 15, a glass plate 16, a celluloid sheet 17, and another glass plate 16, thereupon cover frame 15 and upper glass plate 16 with pad 21, and then place my tray, together with the parts assembled upon it, upon the lower platen 22 of a press, the platens of which are adapted to be heated. I thereupon bring down the upper platen 23 of the press, and effect lamination by application of heat and pressure. Upon completion of the lamination, I raise the upper platen of the press, remove my tray, together with the parts placed thereon, from the press, take the laminated glass from the tray, and place both the tray and pad 21 again into the liquid for a sufficient length of time to become thoroughly cooled, and for pads 11 and 21 to again become thoroughly soaked, whereupon my tray and pad may again be used for another operation like the one just described.

It is also manifest that in other respects the construction of my tray and pad above set forth may be deviated from without departing from the essentials of my invention. All such deviations I intend to cover by my claims.

I claim—

1. In a tray for use in the manufacture of laminated glass, the combination of a baseplate; a pad covering the baseplate; a frame superimposed upon the pad; and bolts connecting the baseplate and the frame, and penetrating the pad, arranged to hold the baseplate, the pad and the frame in vertical alignment while permitting limited upward motion of the frame and unimpeded compression of the parts to be laminated and the pad.

2. In a tray for use in the manufacture of laminated glass, the combination of a baseplate; a pad covering the baseplate; a frame superimposed upon the pad; and bolts connecting the frame with the baseplate and penetrating the pad, arranged to hold the baseplate, the pad and the frame in vertical alignment while permitting limited vertical motion of the frame with reference to the baseplate, without projecting either below the lower face of the baseplate, or above the upper face of the frame upon compression of the frame against the baseplate.

3. Means for use in the manufacture of laminated glass, comprising a baseplate, a frame adapted to hold the parts to be laminated against sidewise movement, and connected to the baseplate so as to be held in vertical alignment while being vertically movable, and two pads designed to absorb and hold a liquid, one of them interposed below the frame upon the baseplate, and the other adapted to cover the frame and the parts to be laminated.

4. Means for use in the manufacture of laminated glass, comprising a baseplate; a frame of substantially the same thickness as the laminated glass to be manufactured, designed to hold the sheets to be laminated against sidewise movement; two pads adapted to absorb and hold a liquid, of suitable size to be interposed below and above the frame and the parts to be laminated; and means connecting the baseplate and the frame, adapted to hold them in vertical alignment while permitting limited upward movement of the frame and unimpeded compression of the parts to be laminated and the pads.

5. In a tray for use in the manufacture of laminated glass, the combination of a baseplate, a pad covering the baseplate, and means attached to the baseplate for holding the pad in position and for holding the sheets to be laminated against sidewise movement on the baseplate, while permitting unimpeded compression of such sheets.

AUGUST W. HORNIG.